United States Patent [19]
Okino et al.

[11] Patent Number: 5,560,893
[45] Date of Patent: Oct. 1, 1996

[54] METHOD FOR CONTROLLING THE OXIDATION OF SULFITES

[75] Inventors: Susumu Okino; Hiroshi Tanaka, both of Hiroshima, Japan

[73] Assignee: Mitsubishi Jukogyo Kabushiki Kaisha, Tokyo, Japan

[21] Appl. No.: 472,488

[22] Filed: Jun. 7, 1995

[30] Foreign Application Priority Data

Jul. 11, 1994 [JP] Japan .................... 6-158569

[51] Int. Cl.$^6$ .................... B01D 53/50; G05D 7/00
[52] U.S. Cl. .................... 423/242.1; 423/243.08; 423/DIG. 5; 422/110
[58] Field of Search .................... 423/243.08, DIG. 5, 423/242.1; 422/110

[56] References Cited

U.S. PATENT DOCUMENTS 5,226,286  11/1993  Ukawa et al. .................... 423/243.08

FOREIGN PATENT DOCUMENTS

| | | | |
|---|---|---|---|
| 0224627A1 | 10/1987 | European Pat. Off. . | |
| 301548 | 3/1993 | Germany | 423/243.08 |
| 62-65927 | 3/1987 | Japan | 423/243.08 |
| 3137918 | 6/1991 | Japan | 423/DIG. 5 |
| 6238126 | 8/1994 | Japan | 423/DIG. 5 |

*Primary Examiner*—Gary P. Straub
*Assistant Examiner*—Timothy C. Vanoy
*Attorney, Agent, or Firm*—Jacobson, Price, Holman & Stern, PLLC

[57] ABSTRACT

In a flue gas desulfurization process wherein, when sulfur oxide-containing exhaust gas is treated with an absorbing solution containing a calcium compound, an oxygen-containing gas is passed through the absorbing solution and the flow rate of the oxygen-containing gas is controlled by detecting the oxidation-reduction potential of the absorbing solution continuously, an oxidation controlling method which comprises detecting a first deviation signal between the oxidation-reduction potential of the absorbing solution and the oxidation-reduction potential of the absorbing solution in a completely oxidized state and controlling the flow rate of the oxygen-containing gas in response to a second deviation signal between the first deviation signal and a preset oxidation-reduction potential deviation value.

3 Claims, 3 Drawing Sheets

METHOD FOR CONTROLLING THE OXIDATION OF SULFITES

FIELD OF THE INVENTION AND RELATED ART

This invention relates to a flue gas desulfurization process and, more particularly, to a method for controlling the oxidation of sulfites.

When sulfur oxide-containing exhaust gas is subjected to flue gas desulfurization according to the wet lime-gypsum process, sulfur dioxide which is a typical sulfur oxide present in the exhaust gas is brought into contact with an absorbing solution containing calcium carbonate and absorbed according to the following reaction. [Chemical Formula 1]

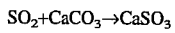

$$SO_2 + CaCO_3 \rightarrow CaSO_3$$

A portion of the calcium sulfite so produced is oxidized by oxygen present in the exhaust gas to form gypsum. [Chemical Formula 2]

$$CaSO_3 + \tfrac{1}{2}O_2 \rightarrow CaSO_4$$

Usually, the oxygen concentration in the exhaust gas is so low that the oxidation of calcium sulfite to gypsum is not sufficiently effected. Consequently, an oxygen-containing gas is supplied from the outside of the system and passed through the absorbing solution.

However, if the flow rate of the oxygen-containing gas is low, the concentration of unoxidized calcium sulfite will increase. This may cause several difficulties including an inhibition of the dissolution of calcium carbonate used as absorbent, a reduction in desulfurization performance, and an increase in the chemical oxygen demand (hereinafter referred to as "COD") of waste water from the desulfurizer.

On the other hand, if an attempt is made to maintain a high degree of conversion of calcium sulfite to gypsum, it is inevitable to supply the oxygen-containing gas in excess with consideration for load fluctuations and the like. This leads to an increase in running cost and a rise in the COD of waste water.

Accordingly, it is necessary to control the flow rate of the oxygen-containing gas so as to remain in a proper range.

In order to control the flow rate of the oxygen-containing gas involved in the oxidation of calcium sulfite, a method based on the use of oxidation-reduction potential (hereinafter referred to as "ORP") is known. In the conventional method for controlling the flow rate in response to ORP, a preset ORP value is determined in advance on the basis of the preestablished relationship between ORP and sulfurous acid concentration, and the flow rate is controlled in response to a deviation signal between a signal obtained by detecting the ORP of the absorbing solution continuously and the preset ORP value.

FIG. 3 shows one example of the relationship between the ORP and sulfurous acid concentration of an absorbing solution containing calcium carbonate as observed when exhaust gas containing 1,000 ppm of $SO_2$ is treated by contact with the absorbing solution according to the wet lime-gypsum process. This indicates that the ORP is affected by pH in addition to sulfurous acid concentration.

An oxidation controlling method taking into account the above-described influence of pH on the ORP is also known. In this method, a preset ORP value is derived from signals obtained by continuous detection of the ORP and pH of the absorbing solution, and the flow rate of the oxygen-containing solution is controlled in response to a deviation signal between the ORP of the absorbing solution and the preset ORP value.

However, since the ORP is affected by dissolved solution components in addition to sulfurous acid concentration and pH, changes of dissolved solution components or erroneous indications of the pH meter may make it impossible to achieve stable oxidation control.

As described above, the conventional methods have the disadvantage that stable oxidation control cannot be achieved because of variation in pH and changes of dissolved solution components, which result from load fluctuations, changes of the absorbent material, and/or changes of the type of fuel, as well as erroneous indications of the pH meter. This may cause such difficulties as an increase in the COD of waste water due to an increase in sulfurous acid concentration or an oversupply of air.

SUMMARY OF THE INVENTION

In view of the above-described technical level, an object of the present invention is to provide a method for controlling the oxidation of sulfites which, when employed in a flue gas desulfurization process for treating sulfur oxide-containing exhaust gas according to the wet lime-gypsum process, can overcome the disadvantages of the conventional methods.

Under the above-described circumstances, the present inventors made intensive investigations on an oxidation controlling method in which, when sulfur oxide-containing exhaust gas is subjected to flue gas desulfurization according to the wet lime-gypsum process, the flow rate of an oxygen-containing gas is controlled by detecting the ORP of the absorbing solution continuously, and have now discovered that, since the ORP is affected by pH and dissolved solution components in addition to sulfurous acid concentration, it is desirable to detect a first deviation signal between the ORP of the absorbing solution and the ORP of the absorbing solution in a completely oxidized state and control the flow rate of the oxygen-containing gas in response to a second deviation signal between the first deviation signal and a preset ORP deviation value determined in advance on the basis of the known relationship between sulfurous acid concentrations and ORP values. The present invention has been completed on the basis of this discovery.

Thus, the present invention provides, in a flue gas desulfurization process wherein, when sulfur oxide-containing exhaust gas is treated with an absorbing solution containing a calcium compound, an oxygen-containing gas is passed through the absorbing solution and the flow rate of the oxygen-containing gas is controlled by detecting the oxidation-reduction potential of the absorbing solution continuously, an oxidation controlling method which comprises detecting a first deviation signal between the oxidation-reduction potential of the absorbing solution and the oxidation-reduction potential of the absorbing solution in a completely oxidized state and controlling the flow rate of the oxygen-containing gas in response to a second deviation signal between the first deviation signal and a preset oxidation-reduction potential deviation value.

The present invention has been completed as a result of intensive investigations made with a view to maintaining oxidation control stably in response to ORP. On the basis of the discovery that the ORP is affected by pH and dissolved solution components in addition to sulfurous acid concentration, a first deviation signal between the ORP of the absorbing solution and the ORP of the absorbing solution in a completely oxidized state is detected continuously and the flow rate of the oxygen-containing gas is controlled in response to a second deviation signal between the first deviation signal and a preset ORP deviation value. This makes it possible to maintain stable oxidation control in spite of variation in pH and changes of dissolved solution components, and thereby reduce the COD of waste water.

DETAILED DESCRIPTION OF PREFERRED EMBODIMENTS

Figure 1:
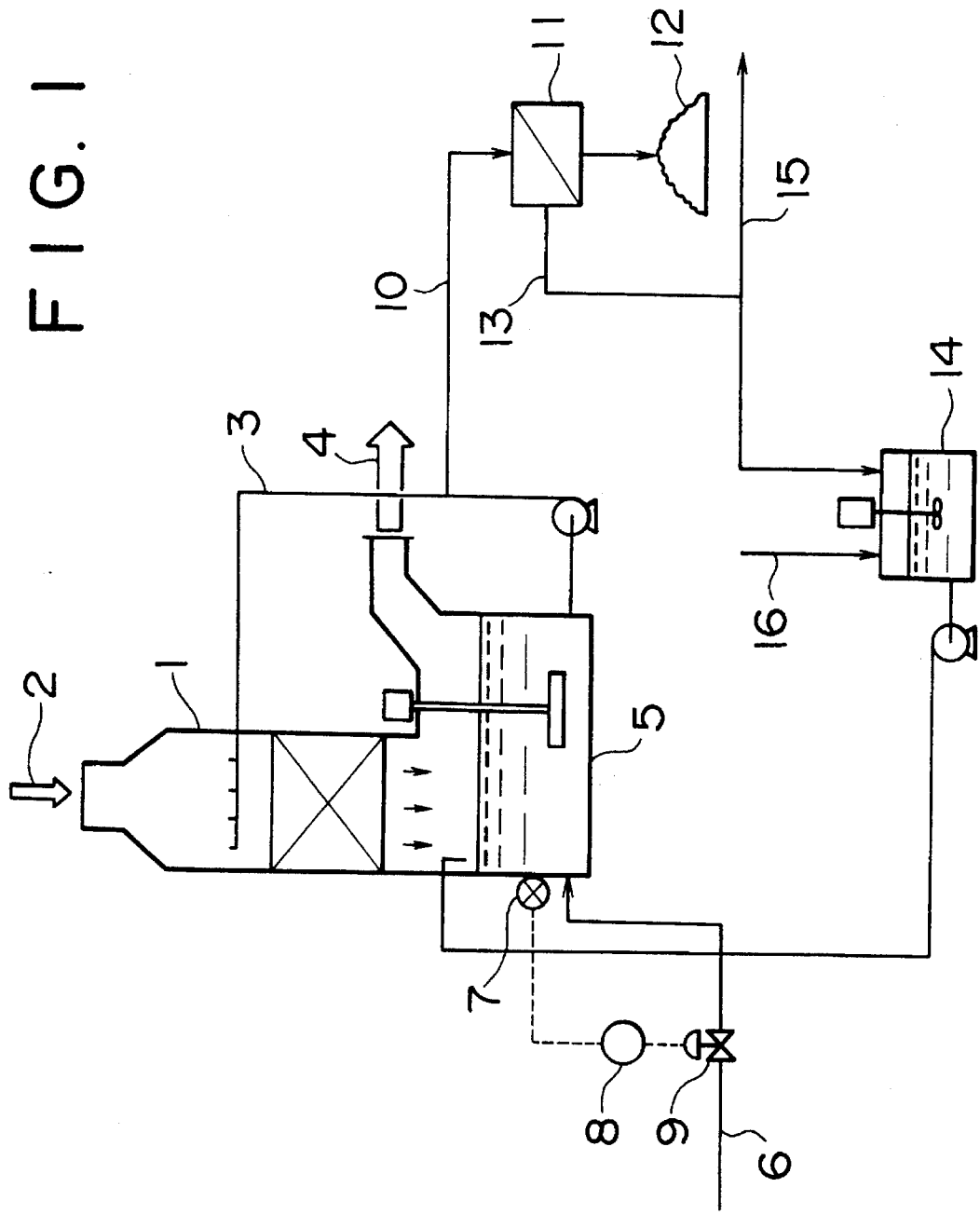
FIG. 1 is a schematic view illustrating one embodiment of the present invention.

One embodiment of the present invention is described hereinbelow with reference to FIG. 1. Combustion exhaust gas 2 introduced into an absorption tower 1 is brought into gas-liquid contact with an absorbing solution 3 circulating through the absorption tower, so that sulfur oxides present in the combustion exhaust gas are absorbed and separated. The combustion exhaust gas from which sulfur oxides have been removed is discharged as a clean gas 4. The sulfur dioxide absorbed into the absorbing solution 3 is converted to calcium sulfite, a part of which is oxidized by oxygen present in combustion exhaust gas to form gypsum. Unoxidized calcium sulfite present in the absorbing solution is oxidized by air 6 passed through a liquid reservoir 5 of the absorption tower to form gypsum.

The above-described oxidation is controlled by the following method. A first deviation signal between the ORP of the absorbing solution detected by an ORP detector 7 and the ORP of the absorbing solution in a completely oxidized state is fed to a flow rate controller 8, which produces a control valve opening/closing signal in response to a second deviation signal between the first deviation signal and a preset ORP deviation value determined in advance on the basis of the relationship between known sulfurous acid concentrations and ORP values. The flow rate of air is regulated by controlling a control valve 9 in response to the opening/closing signal.

Figure 2:
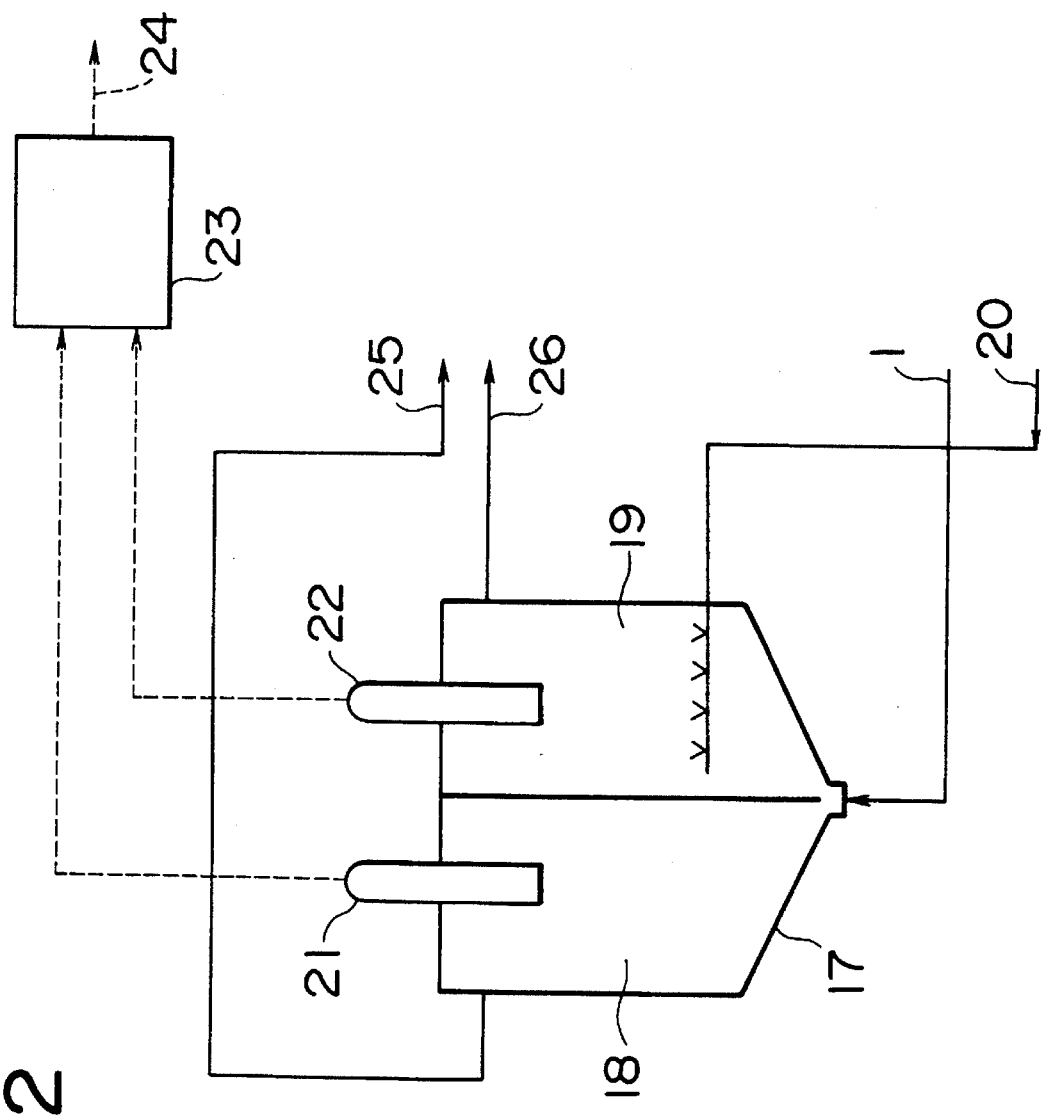
FIG. 2 is a schematic view illustrating the construction of an exemplary ORP detector in accordance with the present invention.
Figure 3:
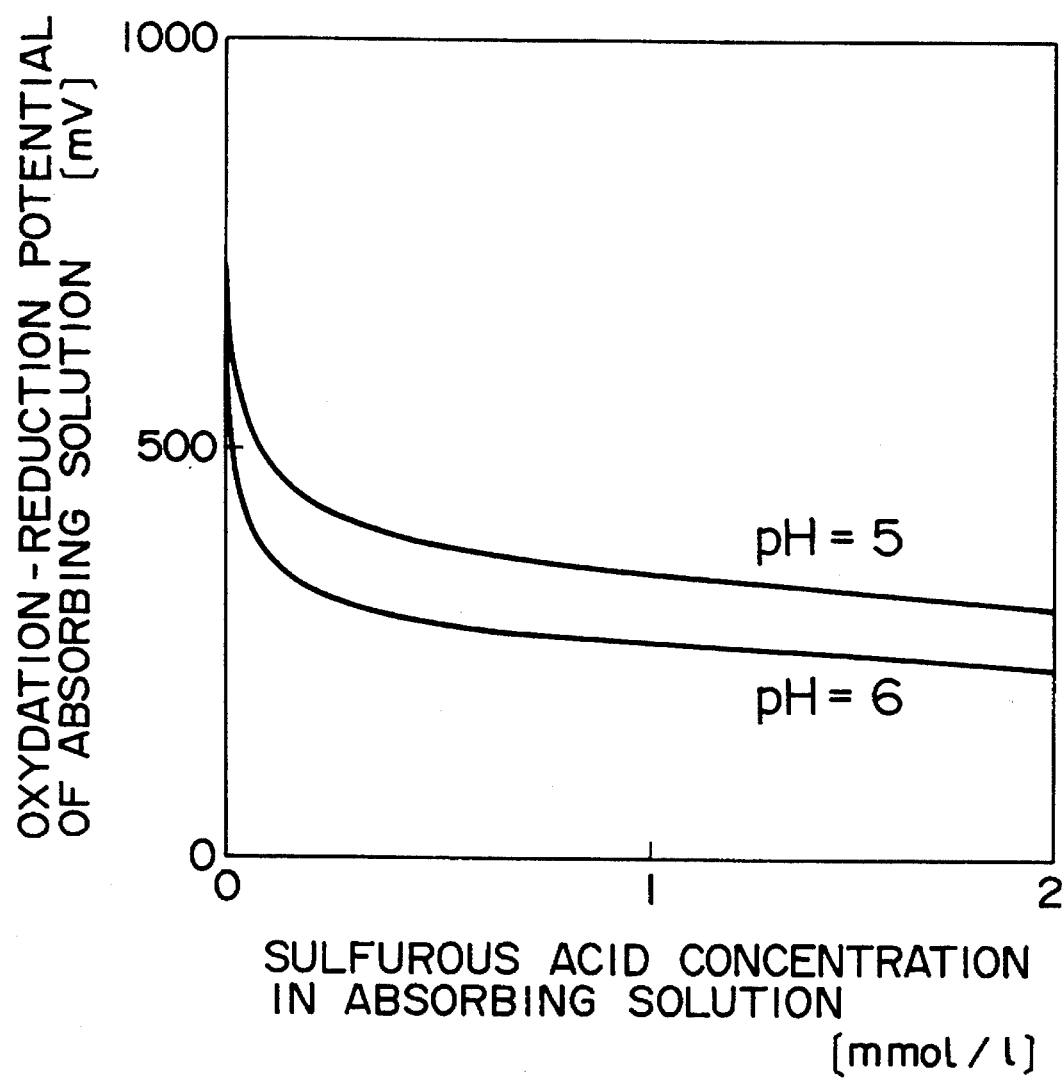
FIG. 3 is a graph showing the relationship between the sulfurous acid concentration and oxidation-reduction potential of an absorbing solution.

FIG. 2 illustrates the construction of an exemplary ORP detector. A portion of the absorbing solution 1 is introduced into an ORP measuring tank 17. The ORP measuring tank 17 is partitioned into a sample liquid tank 18 and a reference liquid tank 19. In the reference liquid tank 19, the absorbing solution is completely oxidized by supplying air 20 from the outside of the system. In these tanks, the ORP of the absorbing solution and the ORP of the absorbing solution in a completely oxidized state are detected by ORP electrodes 21 and 22, respectively. The detected signals are fed to an arithmetic unit 23 where the deviation between the ORP of the absorbing solution and the ORP of the absorbing solution in a completely oxidized state is calculated. The resulting deviation signal 24 is sent from the arithmetic unit 23. After ORP measurements are made, the return absorbing solution from sample liquid tank 25 and the return absorbing solution from reference liquid tank 26 are returned again to the liquid reservoir 5 of the absorption tower.

Calculations of the above-described deviations are made according to the following formulas.

[Mathematical Formula 1]

(Deviation between the ORP of the absorbing solution and
the ORP of the absorbing solution in a completele oxidized
state) = (ORP of the absorbing solution in a completely
oxidized state) − (ORP of the absorbing solution)

[Mathematical Formula 2]

(Preset ORP deviation value) = (ORP of the absorbing
solution in a completely oxidized state as determined from
the known relationship between sulfurous acid concentrations
and ORP values) − (ORP of the absorbing solution at a preset
sulfurous acid concentration as determined from the relationship
between known sulfurous acid concentrations and ORP values)

[Mathematical Formula 3]

[Deviation between (deviation between the ORP of the
absorbing solution and the ORP of the absorbing solution in
a completely oxidized state) and (preset ORP deviation
value)] = (Deviation between the ORP of the absorbing
solution and the ORP of the absorbing solution in a
completely oxidized state) − (Preset ORP deviation value)

Now, the oxidation controlling method using the above-defined deviation calculating formulas is described hereinbelow. If the deviation between the ORP of the absorbing solution and the ORP of the absorbing solution in a completely oxidized state is greater than the preset ORP deviation value, the opening of the control valve 9 is increased to cause an increase in the flow rate of air 6. When the ORP of the absorbing solution is raised as a result of the increase in the flow rate of air 6 and the deviation between the ORP of the absorbing solution and the ORP of the absorbing solution in a completely oxidized state becomes less than the preset ORP deviation value, the flow rate of air 6 is decreased. Thus, oxidation is controlled by using, as an index, the deviation between the ORP of the absorbing solution and the ORP of the absorbing solution in a completely oxidized state.

Since gypsum formed by the above-described oxidation has a low solubility, it precipitates from the absorbing solution in the form of a solid. Part of the absorbing solution containing gypsum is discharged from the absorption tower 1 by way of a withdrawal line 10, and separated into gypsum 12 and filtrate 13 by means of a solid-liquid separator 11. Part of the filtrate 13 is fed to a an absorbent preparation tank 14 and the remainder is discharged from the system as waste water 15. In the absorbent preparation tank 14, the filtrate is replenished with calcium carbonate 16 and returned again to the absorption tower.

EXAMPLE

In order to further illustrate the present invention, an example is given. The operating conditions employed in this example are shown in Table 1 below.

TABLE 1

| Description of exhaust gas | Inlet gas flow rate: 200 m$^3$N/h (dry) |
|---|---|
| | Inlet SO$_2$ concentration: 1,000 ppm (dry) |
| Absorption tower | Circulation rate of absorbing solution: 3.9 m$^3$/h |
| | Capacity of liquid reservoir of absorption tower: 0.2 m$^3$ |
| | Preset ORP deviation value: 300 mV |

When the above-described system and operating conditions were employed, stable oxidation control could be maintained in spite of variation in pH. The COD of waste water was 7 mg/liter.

COMPARATIVE EXAMPLE

Instead of using the above-described ORP detector, a preset ORP value was derived from signals obtained by continuous detection of the ORP and pH of the absorbing solution, and oxidation control was performed in response to a deviation signal between the ORP of the absorbing solution and the preset ORP value. Although the system and other operating conditions were the same as those employed in the example, the COD of waste water (i.e., 43 mg/liter) was significantly higher than that achieved in the example, because of erroneous indications of the pH meter and changes of dissolved solution components.

We claim:

1. In a flue gas desulfurizing process wherein, when sulfur oxide-containing exhaust gas is treated with an absorbing solution containing a calcium compound, an oxygen-containing gas is passed through the absorbing solution and the flow rate of the oxygen-containing gas is controlled by detecting oxidation-reduction potential of the absorbing solution continuously, an oxidation controlling method which comprises:

detecting a first deviation signal between the oxidation-reduction potential of the absorbing solution and the oxidation-reduction potential of the absorbing solution in a completely oxidized state; and controlling the flow rate of the oxygen-containing gas in response to a second deviation signal between the first deviation signal and a preset oxidation-reduction potential deviation value, wherein the preset oxidation-reduction potential deviation value is the oxidation-reduction potential of the absorbing solution in a completely oxidized state, as determined from a known relationship between sulfurous acid concentrations and oxidation-reduction potential values, less the oxidation-reduction potential of the absorbing solution at a preset sulfurous acid concentration, as determined from a relationship between known sulfurous acid concentrations and oxidation-reduction potential values.

2. In the flue gas desulfurizing process of claim 1 wherein the step of controlling the flow rate of oxygen-containing gas comprises:

increasing the flow rate of oxygen-containing gas when the deviation between the oxidation-reduction potential in the absorbing solution and the oxidation-reduction potential of the absorbing solution in a completely oxidized state exceeds the preset oxidation-reduction potential deviation value.

3. In the flue gas desulfurizing process of claim 1 wherein the step of controlling the flow rate of oxygen-containing gas comprises:

decreasing the flow rate of oxygen-containing gas when the deviation between the oxidation-reduction potential in the absorbing solution and the oxidation-reduction potential of the absorbing solution in a completely oxidized state is less than the preset oxidation-reduction potential deviation value.

* * * * *